July 21, 1964  A. TURCAT  3,141,300
AIRCRAFT INSTRUMENT FOR THE CONTROL OF AN AIR-INTAKE
OF VARIABLE SHAPE FOR A SUPERSONIC ENGINE
Filed Nov. 14, 1962  5 Sheets-Sheet 1

Inventor:
André Turcat
By
Karl W. Flocke
Attorney

July 21, 1964          A. TURCAT          3,141,300
AIRCRAFT INSTRUMENT FOR THE CONTROL OF AN AIR-INTAKE
OF VARIABLE SHAPE FOR A SUPERSONIC ENGINE
Filed Nov. 14, 1962                      5 Sheets-Sheet 3

Inventor
Andre Turcat
By

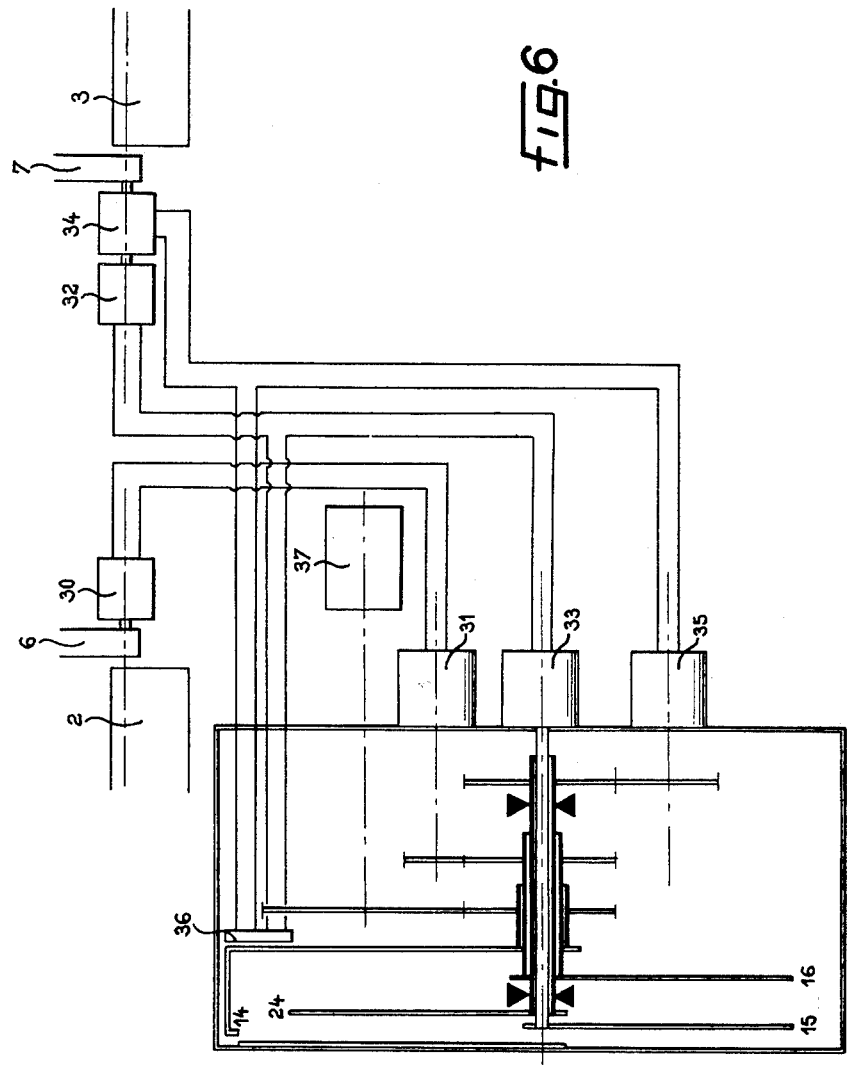

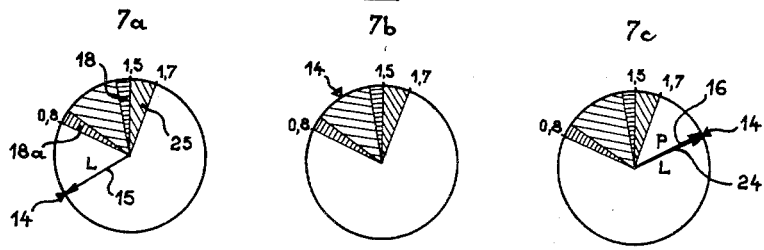
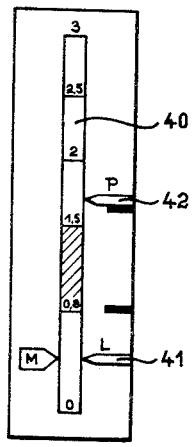
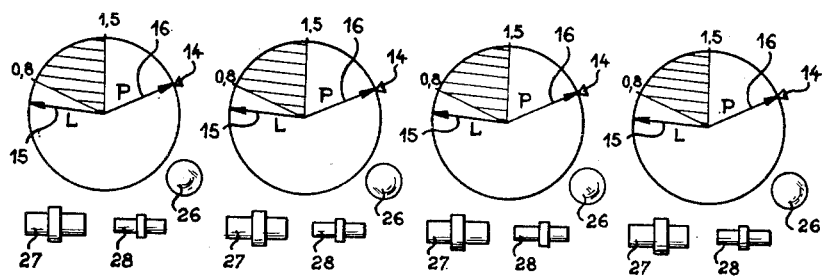

United States Patent Office 3,141,300
Patented July 21, 1964

3,141,300
AIRCRAFT INSTRUMENT FOR THE CONTROL OF AN AIR-INTAKE OF VARIABLE SHAPE FOR A SUPERSONIC ENGINE
André Turcat, Bures-sur-Yvette, France, assignor to Nord-Aviation Societe Nationale de Constructions Aeronautiques, Paris, France, a joint-stock company of France
Filed Nov. 14, 1962, Ser. No. 237,574
Claims priority, application France Nov. 17, 1961
12 Claims. (Cl. 60—35.6)

The present invention relates to a control panel instrument for controlling the position of the moving parts of an air-intake of variable shape for a supersonic engine.

The realization of good efficiency in supersonic engines (turbo-jets, turbo-blowers, air turbines, ram-jets, combination engines) is subordinate to the use of an air-intake, the shape of which varies as a function of the Mach number, a re-compression of the air being effected in the said air-intake.

These air-intakes of variable shape may comprise one or a number of moving parts, the displacements of which are operated according to the indications of a device for detecting the Mach number of the flight of the aircraft or of a local Mach number. The moving parts may be constituted by a central body, movable or telescopic, along the axis of the air-intake, by movable or deformable parts of walls, by walls of variable permeability, etc.

A strict adaptation of this variable shape to the Mach number is necessary both for good efficiency and for safety. A bad adaptation can in fact result in disturbances of the aerodynamic flow leading to local excess pressures, instability and vibration dangerous to the structure of the air-intake and adversely affecting the behaviour of the engine and the aircraft.

The present invention has essentially for its object to provide the crew of the aircraft with a simple and accurate indication of the position of the moving parts of the air-intake of the supersonic engine for all values of Mach numbers of flight.

The invention has also for its object:

To control the satisfactory adaptation of the positions of the moving parts as a function of the Mach flight number;

In the event of failure of an automatic control of one of the moving parts, to permit the crew to intervene with an emergency control or a manual regulation control;

To permit rapid visual comparison of a number of air intakes by juxtaposition of indicators according to the invention or by the use of a common indicator with a number of superimposed pointers.

By way of example, FIG. 1 shows an air-intake of variable shape for a supersonic engine. This air-intake is of rectangular transverse section and is placed under a wing 1 of the aircraft. It comprises a deformable upper profile 2 and a movable lower lip 3. The side walls are considered as being fixed, but there is nothing to prevent them from being designed also to be deformable or of variable permeability, through the intermediary of a mechanical system coupled either to the upper profile 2 or to the lower lip 3.

The good aerodynamic performance of this air-intake, in which it is required to obtain an optimum aerodynamic compression corresponding to the speed of the aircraft, is obtained by simultaneously regulating the front section of the air intake and the section of its neck by suitable displacements of the moving parts, the lower lip 3 and the upper profile 2. These displacements are effected by means of jacks 4 and 5 which are operated in turn by an operating device, the orders of which are prepared automatically as a function of the flight Mach number.

As the flight Mach number varies from Mach 0 to Mach 0.8 in a zone which is hereinafter termed subsonic, the lower lip 3 passes from a position corresponding to the maximum opening of the air intake, referred to as the low position in the text which follows, because the air intake is mounted under the wing 1 of the aircraft at a position hereinafter known as the high position. During this time, the upper profile 2 remains in its maximum opening position, which will subsequently be known as its high position.

From Mach 0.8 to Mach 1.5, in a zone designated below as the trans-sonic zone, the two members 2 and 3 remain in the high position.

Between these two limits, the flow in the air-intake is entirely subsonic on the downstream side of a frontal shock wave if the flight Mach number is greater than 1.

Beyond and in the vicinity of Mach 1.5, in a zone hereinafter referred to as the supersonic zone, the profile 2 begins to move down, thus reducing the neck of the air-intake. Towards Mach 1.7, the "priming" of the air-intake comes into effect. The flow then becomes supersonic in the front convergent portion of the air-intake, and then subsonic in its divergent downstream portion, on the downstream side of a normal shock wave of internal re-compression.

Above Mach 1.7, the lower lip 3 leaves its high position and the two movable members 2 and 3 thus continue their downward movement to their extreme low positions, corresponding to the maximum Mach adaptation.

In the three zones defined above, two mechanical members define at each instant the shape of the air-intake, namely the elongation of the jacks 4 and 5. Position detectors 6 and 7, for example by potentiometer, are associated with the rod of each of the jacks 4 and 5.

In all the description which follows and also in the annexed claims, it must be understood that the term "lower lip" and "upper profile" are equally applicable to the lower lip 3 and the upper profile 2 effectively shown in FIG. 1, and also to complex assemblies, on condition that each of the said assemblies is displaced under the action of a single control.

The present invention has for its object a control panel instrument for controlling the position of the members which vary the form of the air-intake of a supersonic engine on an aircraft as a function of the speed of the aircraft, the said air-intake comprising two of these variable members, a lower lip and an upper profile, the lower lip passing from a low position to a high position when the Mach number passes from 0 to 0.8, and returning to its low position when the Mach number passes from 1.7 to its maximum adaptation value, the upper profile passing from a high position to a low position when the Mach number passes from 1.5 to its maximum value.

The aircraft instrument according to the invention consists of a Machmeter dial in front of the graduation of which moves a pointer external to the graduation, and of two needles moving over the said dial, the first of these needles being controlled in dependence on the movements of the lower lip so that its position on the graduation of the dial of the Machmeter when the operation is correct, comes exactly opposite that of the pointer of the Machmeter when the Mach number passes from 0 to 0.8, the second needle being controlled in dependence on the movements of the upper profile so that its position on the graduation of the Machmeter dial, when the operation is correct, comes exactly opposite that of the pointer of the Machmeter when the Mach number passes from 1.5 to its maximum value, the first needle then moving in the opposite direction and independently of the pointer over the graduations in Mach numbers of the dial comprised between 0.8 and 0.

Other particular features and advantages of the invention will be brought out in the description which follows below of various forms of embodiment of the invention, reference being made to the accompanying diagrammatic drawings, in which:

FIG. 1, already referred to, is a vertical section of an air-intake of variable shape;

Figure 10:
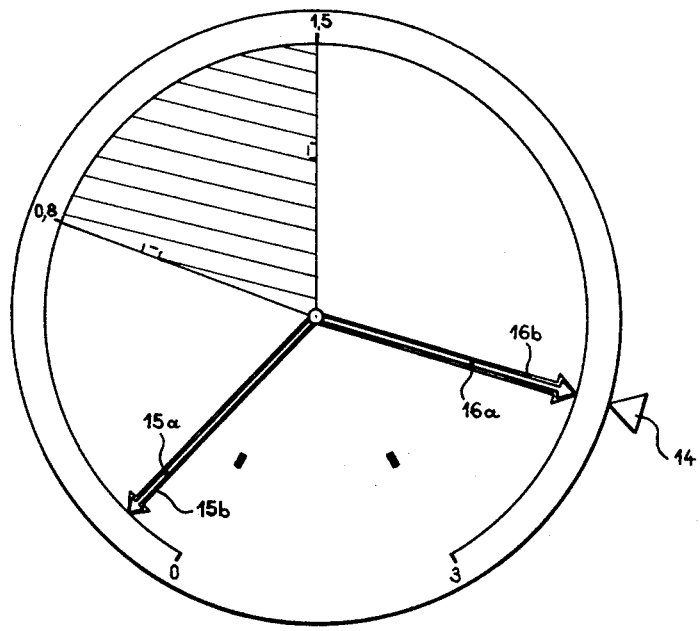
Figure 4:
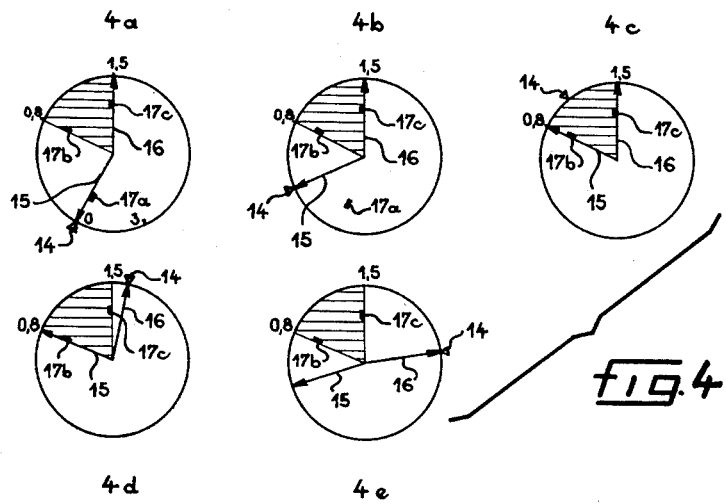
FIG. 4 shows sketches representing the relative positions of the Machmeter pointer and the two needles, for different Mach values.
Figure 5:
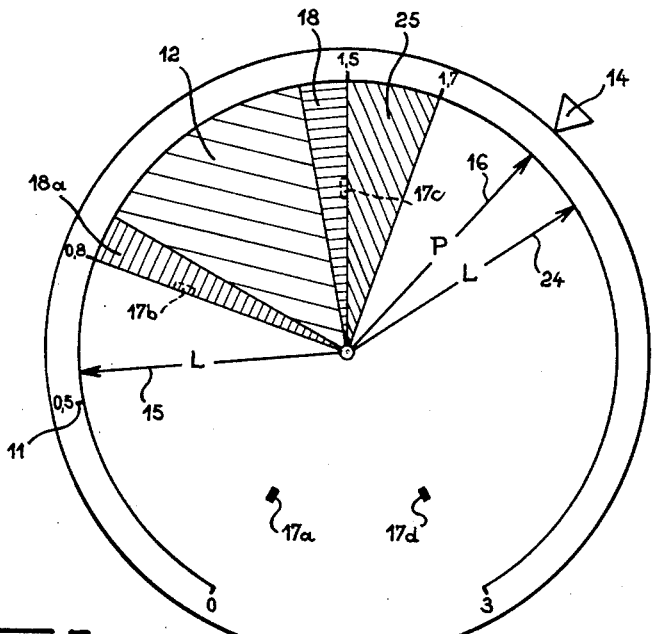

FIG. 5 gives a view of the dial of a first alternative form of the aircraft instrument according to the invention;

FIG. 6 is a diagram of the mechanism of the indicator shown in FIG. 4;

FIG. 7 shows sketches representing the relative positions of the Machmeter pointer and the needles in the construction shown in FIG. 4;

FIG. 8 is a view of a second alternative form of construction of the aircraft instrument according to the invention;

FIG. 9 is a view of the control panel installation of four indicators, in the case of an aircraft having four air-intakes;

FIG. 10 is a view of the instrument adapted for two engines utilizing the zone Mach number.

Figure 1:
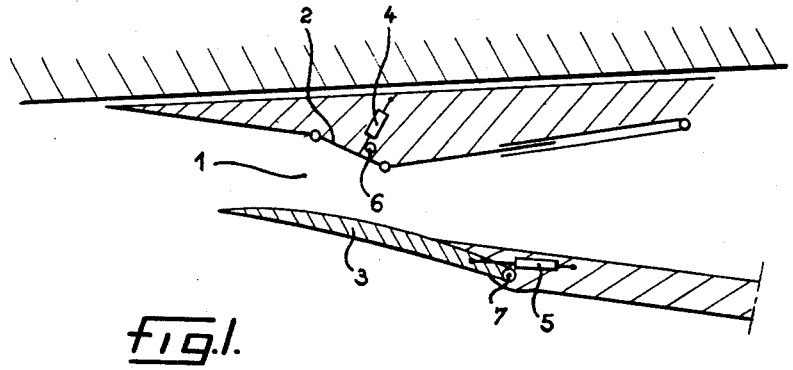
Figure 2:
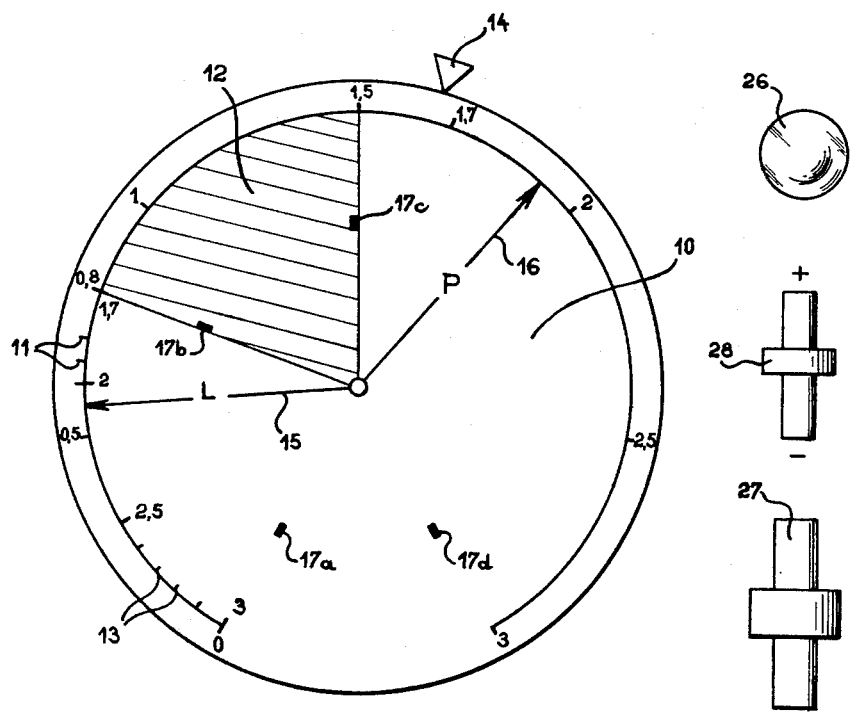
FIG. 2 is a view of the dial of the aircraft instrument according to the invention.

In FIG. 2, the circular dial 10 comprises an external graduation 11 in Mach numbers from 0 to 3 (assuming that 3 is the maximum Mach speed of the aircraft) over the entire utilizable sector of the instrument, a shaded sector 12 covering the trans-sonic zone from Mach 0.8 to Mach 1.5, an internal graduation 13 in the sector covering Mach numbers from 1.7 to Mach 3, engraved in the opposite sense from the first graduation in the sector 0 to 0.8, so that the values 1.7 and 3 of the internal graduation are read opposite the respective values 0.8 and 0 of the external graduation.

A pointer 14 on the outside of the dial indicates the flight Mach number on the outer graduation 11.

Two needles 15 and 16 carry distinctive marks or colours and represent respectively the positions of the lower lip 3 and the upper profile 2 of the air-intake, obtained from detectors 6 and 7 at the level of the operating jacks.

These needles can move inside the respective sectors 0–0.8 and 1.5–3, at the limits of which they come in contact with stops 17. The trans-sonic sector 12 is thus never associated with these needles.

The needle 15, representing the movement of the lower lip 3, is driven by an electric repetition motor system of conventional type (selsyn for example) reproducing the information from the detector 7 through the intermediary of an appropriate cam profiled in such manner that, or by means of a potentiometer having a winding such that the law chosen for the movement of the lip as a function of the Mach number corresponds to a movement of the needle 15 which brings the latter at every instant opposite the Mach number read on the outer graduation corresponding to its position in subsonic flight.

Thus the lower stop 17a of the needle 15 opposite the Mach number 0 represents the extreme position of the lip 3 in the "stationary position," that is to say the low position, while the upper stop 17b at Mach 0.8 (or very nearly) represents the extreme position in the trans-sonic zone, that is to say the high position. At each Mach number less than 0.8, the correct operation of the lip 3 is thus shown by the fact that the needle 15 comes into position opposite the pointer 14 and above the corresponding Mach graduation.

At a Mach value higher than 1.7, the lip 3 must again open and the needle 15 turns back in its travel. The law of its displacement is determined by the law chosen for the movement of the lip itself and by the cam or potentiometer previously referred to. The inner graduation 13 is then engraved downwards as a function of the position of the needle 15, and carries the corresponding Mach numbers from 1.7 (or very nearly), that is to say in the vicinity of the "priming" of the air-intake at the level of the upper stop 17b up to the maximum Mach number at the level of the lower stop 17a.

The needle 16 representing the movement of the upper profile 2 is actuated in the same manner by a position repeater of the detector 6, through the intermediary of a cam profiled in such manner that, or of a potentiometer with a winding such that the movement of the needle brings the latter at every instant opposite the Mach number on the graduation 11 for a corresponding position of the profile of the air-intake, according to the law of adaptation selected in supersonic flight.

Thus the stop 17c, at a Mach number in the neighbourhood of 1.5 represents the extreme open (high) position of the profile 2, the upper stop 17d, the extreme (low) position at the maximum Mach number. At each Mach number greater than 1.5, the correct operation of the profile 2 is thus shown by the fact that the needle 16 comes into position opposite the pointer 14 and above the corresponding Mach graduation.

Figure 3:
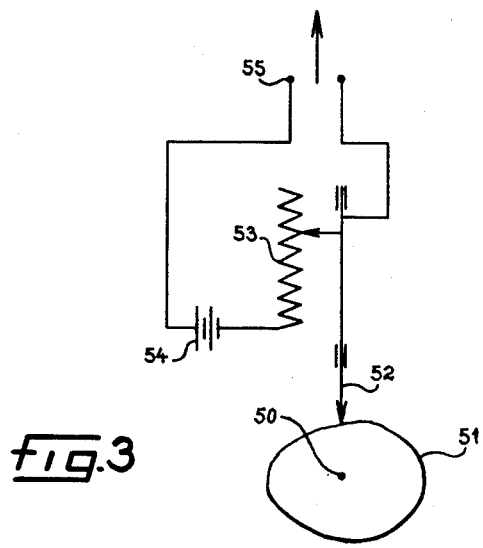
FIG. 3 is a basic diagram of the transmission of the indication from a detector to the indicator.

In FIG. 3, which shows diagrammatically by way of example, the principle of the transmission of the indication given by a detector 6, 7, to one of the needles 15, 16 of the indicator, a cam 51 is keyed on the shaft 50 of each of the detectors. A push-rod 52 to which is coupled the slider of the potentiometer 53, is actuated by the said cam, the profile of this cam being such that it reproduces the law of movement of the corresponding movable surface 2, 3 of the air-intake. A motor driving the needle (not shown) and an appropriate source of voltage 54 are in circuit with the said potentiometer 53. The voltage collected at 55 is transmitted to the said driving motor.

It is clear that the movement of the needle may just as well be produced by a non-linear potentiometer, in which the law governing the winding reproduces that represented by the cam 51. The slider of such a potentiometer is then directly driven by the shaft 50 of the corresponding detector.

As shown FIG. 4, satisfactory operation of the whole of the air-intake of variable shape is definitely shown by the fact that at any non-trans-sonic Mach number, the Mach pointer 14 coincides with one of the needles 15 or 16, the other being located in an easily checked position.

At a Mach number equal to or less than 0.8 (FIGS. 4a and 4b), the pointer 14 coincides with the lip needle 15, while the profile needle 16 is on its lower stop 17c. At a Mach number between 0.8 and 1.5 (FIG. 4c), the Mach pointer 14 is "neutralized" in the shaded sector, the two needles 15 and 16 being on their trans-sonic stops 17b and 17c.

Finally, at Mach numbers greater than 1.7 (FIGS. 4d, 4e), the pointer 14 again coincides with the profile needle 16, while the lip needle 15 returns progressively towards its lower stop 17a, indicating on the inner graduation 13 a Mach number equal to that which is read against the pointer 14 and against the profile needle 16 on the outer graduation 11, which is easy to check.

The form of embodiment shown in FIG. 5 has been developed in order to provide a still more immediate reading of the adaptation of the two moving members 15 and 16, at the cost of a reduced simplicity of the instrument.

No change is made to the outer graduation 11 or to the movement of the pointer 14, which are elements of a conventional Machmeter, the operation of which it would furthermore be difficult and not very opportune to modify.

The movement of the profile needle 16 is also retained with the exception that on its lower stop 17c corresponding to Mach numbers less than 1.5, the needle 16 is covered by a masking strip 18.

The lip needle 15 has the same movement at Mach numbers less than 0.8 but comes under the masking strip 18a on reaching its upper stop 17b.

Above Mach 1.7 a new needle 24 appears. This new needle 24, hidden by a masking strip 25 at Mach numbers less than 1.7, is intended to replace in the supersonic zone the lip needle 15 of the embodiment shown in FIG. 2. The servo-control mechanism of this needle 24 acts in such manner that it is moved opposite the pointer 14 of the Mach number if the lip 3 is moved correctly, coinciding therefore with the profile needle 16.

The same detector 7 of the position of the jack 5 forms the basis of the indication of the lip position, either by the needle 15 or by the needle 24, depending on which is in subsonic or in supersonic, the transition of the drive from one needle to the other being caused by the Machmeter itself when its pointer 14 passes through the "neutralized" trans-sonic zone, the change-over being effected by an appropriate clutch system, a mechanical transition from one cam to another, or a transition by electrical contact from one potentiometer to another. This latter solution is shown by way of example in FIG. 6.

In FIG. 6, the movement of the lower lip 3 is indicated by one or the other of the two needles 15 and 24, depending on whether the flight is subsonic or supersonic. The potentiometers 30, 32, 34 are non-linear, the winding of the potentiometer 30 corresponding to the law of movement of the upper profile 2, the windings of the potentiometers 32 and 34 corresponding to the law of movement of the lower lip 3, these two laws varying as a function of the Mach number of flight.

While the profile needle 16 is driven through the intermediary of the single potentiometer 30 coupled to the detector 6 and the single motor 31, the needle 15 of the lip is driven through the intermediary of the potentiometer 32 coupled to the detector 7 and by the motor 33, as long as the pointer 14 of the Machmeter 37, passing into the trans-sonic zone, has not operated the contact 36. When this contact is operated, the supply is cut-off to the motor 33 and is applied between the potentiometer 34, also coupled to the detector 7, and the motor 35, thus actuating the needle 24.

Whatever the Mach number may be, in this form of embodiment there is no needle which comes opposite the Mach pointer.

If the Mach number is less than 0.8 (see FIG. 7a), the needle 15 is opposite the pointer 14. If the Mach number is trans-sonic, no needle makes its appearance as long as the pointer is located on the shaded sector (FIG. 7b).

If the Mach number is greater than 1.5, there is brought opposite the pointer 14, first the needle 16 at $$1.5 < \text{Mach} < 1.7$$

and then the needles 16 and 24 simultaneously at Mach numbers greater than 1.7 (see FIG. 7c).

The control of the adaptation of the movable numbers of the air-intake is then immediate.

In another form of embodiment shown in FIG. 8, use is made of the well-known technique of linear indicators.

The main Mach graduation 40 is in this case a central graduation. The Mach pointer 14 is only displaced for example to the left of this graduation and the lip needle 41 and the profile needle 42 to the right.

This form of embodiment may be designed either like that shown in FIG. 2 or similar to that shown in FIG. 5. In other words, the two needles can each be displaced over a different portion of the graduation of the Machmeter in the supersonic zone, or alternatively they may be superimposed in this same zone.

Each indicator according to the invention is advantageously completed by the following instruments, shown in FIG. 2:

(1) An alarm lamp 26, the lighting of which is produced by a difference between the position order transmitted to one of the two operating jacks 4 and 5 of the movable members 2 and 3 of the air-intake, and the position actually taken-up by the jack. The detection of this difference is preferably made at the actual level of the jacks, for example by a comparison of the electric voltages delivered respectively by the order transmitter and by the position detector, the appearance of a difference in voltage between these two elements, either for the profile 2 or for the lip 3, acting through the intermediary of a relay to light the lamp 26. Any failure in the mechanical driving system is thus revealed instantaneously and the attention of the crew is drawn to such failure.

On the other hand, a defect in the driving device itself (position calculation) is shown by a single difference between the Mach pointer 14 and the lip needle 15 or the profile needle 16, which indicates that a checking of this device is necessary.

(2) A rocking contact handle 27 with three positions: a central position marked "Automatic" and corresponding to the automatic operation of the movable member jacks by direct operation from the calculating device as a function of the Mach number; a lower position, marked "Emergency," short-circuiting the calculation device and directly controlling the movement of the moving members to the positions determined as the safest and most likely to prevent a dangerous aerodynamic speed of the air-intake; an upper position, in which the control is carried out by hand.

(3) A three-position contact 28 with return to neutral, permitting of operation by hand and sending an order by + or − to the operating jacks 4 and 5 of the movable members 2 and 3, this order being substituted for the order produced by the calculation device when the contact 27 is put in the manual position.

The manual control comprises the recall by a + or − order, of the lip needle or the profile needle towards its correspondence with the Mach pointer 14, depending on whether the latter indicates a Mach number greater or less than that on which the lip needle or profile needle are located.

Finally, in the case of a multi-engine aircraft, two or more engines may utilize the same air-intake. There is then only one indicator and this will take the form described above.

In the case where each engine, or each group of grouped engines utilizes a particular reference Mach number, a battery of indicators will be juxtaposed in width in the manner shown in FIG. 9 or in height. Any divergence of any of the needles will be easily and rapidly observed by the crew in consequence of this juxtaposition.

If two or more engines or groups of engines utilize the same reference Mach number, it is also possible to use a multiple indicator, as shown in FIG. 10 for the case of two engines, in which two needles 15a and 15b on the one hand and 16a and 16b on the other are superimposed for normal working, the form of embodiment selected being that shown in FIG. 2.

I claim:

1. An aircraft instrument for checking the positions of displaceable members adapted to vary the shape of the air-intake of a supersonic aircraft engine in dependence on the speed of the aircraft, said air-intake comprising two said displaceable members, a lower lip and an upper profile, said lower lip passing from a low position to a high position when the flight Mach number passes from 0 to 0.8 and returning to its low position when the Mach number passes from 1.7 to its maximum adaptation value, while said upper profile passes from its high position to a low position when the Mach number passes from 1.5 to its maximum value, said instrument comprising essentially a graduated Machmeter dial, an outer pointer moving along the graduations of said dial, and at least two needles adapted to move over said dial, means for actuating a first of said needles in dependence on the displacements of said lower lip so that its position on said graduations is exactly opposite that of said pointer when the Mach number passes from 0 to 0.8, means for actuating a second of said needles in dependence on the displacements of said upper profile so that its position on said dial graduations is exactly opposite that of said pointer when the Mach number passes from 1.5 to its maximum value, said first means also actuating said first needle to move it in the opposite direction, independently of said pointer, over the graduations of said dial between 0.8 and 0.

2. An aircraft instrument as claimed in claim 1, in which the displacement of said lower lip is effected by the operating rod of a jack, the servo-control of the corresponding needle resulting from said displacement comprising a device for detecting the displacements of said jack rod, a shaft for said detecting device, and an electric repeater motor of conventional type, the information provided by said detection device being transmitted to said motor by means of a device whose operating characteristics are such that the law governing the displacement of said lip as a function of the Mach number results in a displacement of said needle over said Machmeter dial coincident with the displacement of said pointer when the Mach number passes from 0 to 0.8, and in a displacement of said needle from 0.8 to 0 when the Mach number passes from 1.7 to its maximum value, said needle remaining stationary when the Mach number varies from 0.8 to 1.7.

3. An aircraft instrument as claimed in claim 1, in which the displacement of the upper profile of said air-intake is effected by the operating rod of a jack, the servo-control of the corresponding needle resulting from said displacement comprising a device for detecting the displacement of said jack rod, a shaft for said detection device, and an electric repeater motor of conventional type, the information provided by said detection device being transmitted to said motor by means of a device whose operating characteristics are such that the law governing the displacement of said upper profile as a function of the Mach number results in a displacement of said needle over said Machmeter dial coincident with the displacement of said pointer when the Mach number passes from 1.5 to its maximum value, said needle being stationary for Mach numbers between 0 and 1.5.

4. An aircraft instrument as claimed in claim 2, in which said transmission device is a cam having a profile adapted to embody said law, said cam being keyed on the shaft of the corresponding detection device and actuating a push-rod coupled to the slider of a linear potentiometer, said potentiometer being in circuit with a source of electric current and an electric motor adapted to drive the needle corresponding to said lower lip.

5. An aircraft instrument as claimed in claim 3, in which said transmission device is a cam having a profile adapted to embody said law, said cam being keyed on the shaft of the corresponding detection device and actuating a push-rod coupled to the slider of a linear potentiometer, said potentiometer being in circuit with a source of electric current and an electric motor adapted to drive the needle corresponding to said upper profile.

6. An aircraft instrument as claimed in claim 2, in which said transmission device comprises a non-linear potentiometer the winding of which embodies said law, said potentiometer being in circuit with a source of electric current and an electric motor adapted to drive the needle corresponding to said lower lip, the slider of said potentiometer being directly driven by the shaft of the corresponding detection device.

7. An aircraft instrument as claimed in claim 3, in which said transmission device comprises a non-linear potentiometer, the winding of which embodies said law, said potentiometer being in circuit with a source of electric current and an electric motor adapted to drive the needle corresponding to said upper profile, the slider of said potentionmeter being directly driven by the shaft of the corresponding detection device.

8. An aircraft instrument as claimed in claim 1, in which two needles are controlled in dependence on the displacements of said lower lip, one said needle moving opposite the said pointer between Mach 0 and Mach 0.8, the other needle also moving opposite said pointer between Mach 1.7 and the maximum Mach value, over which zone its position coincides with that of the needle controlled in dependence on the displacements of said upper profile.

9. An aircraft instrument as claimed in claim 8, in which the two said needles controlled in dependence on the displacements of said lower lip are each actuated by a non-linear potentiometer and an electric motor, a contact operated by the passage of the said pointer releasing either one needle or the other, depending on whether the speed is in the subsonic or the trans-sonic zone.

10. An aircraft instrument as claimed in claim 9, in which said first needle is concealed by a masking strip at speeds higher than Mach 0.8, the second said needle being concealed by a second masking strip when the Mach number is less than 1.7.

11. An aircraft instrument as claimed in claim 8, in which the needle actuated in dependence of the displacements of said upper profile is concealed by a masking strip when the Mach number is less than 1.5.

12. An aircraft instrument as claimed in claim 8, in which the graduations of said instrument and said Machmeter are of the linear type.

References Cited in the file of this patent

UNITED STATES PATENTS

| | | |
|---|---|---|
| 2,881,527 | Walter et al. | Apr. 14, 1959 |
| 2,911,787 | Barry | Nov. 10, 1959 |
| 2,942,460 | Morgan | June 28, 1960 |
| 2,950,594 | Mitrovich et al. | Aug. 30, 1960 |